US012394373B2

(12) United States Patent
Hu

(10) Patent No.: US 12,394,373 B2
(45) Date of Patent: Aug. 19, 2025

(54) PIXEL DRIVING CIRCUIT AND DISPLAY PANEL

(71) Applicant: TCL China Star Optoelectronics Technology Co., Ltd., Guangdong (CN)

(72) Inventor: Liang Hu, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/793,672

(22) PCT Filed: Jul. 1, 2022

(86) PCT No.: PCT/CN2022/103210
§ 371 (c)(1),
(2) Date: Dec. 7, 2023

(87) PCT Pub. No.: WO2023/231130
PCT Pub. Date: Dec. 7, 2023

(65) Prior Publication Data

US 2024/0221640 A1 Jul. 4, 2024

(30) Foreign Application Priority Data

May 31, 2022 (CN) ......................... 202210615801.3

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0852* (2013.01); *G09G 2320/0233* (2013.01)

(58) Field of Classification Search
None
See application file for complete search history.

(56) References Cited

U.S. PATENT DOCUMENTS 10,643,537 B2 5/2020 Kwon et al.
11,205,388 B2 12/2021 Im et al.
(Continued)

FOREIGN PATENT DOCUMENTS

CN 106935198 7/2017
CN 107564476 1/2018
(Continued)

OTHER PUBLICATIONS

International Search Report and the Written Opinion Dated Dec. 27, 2022 From the International Searching Authority Re. Application No. PCT/CN2022/103210 and Its Translation Into English. (20 Pages).

(Continued)

*Primary Examiner* — Christopher R Lamb

(57) ABSTRACT

A pixel driving circuit and a display panel are provided. The pixel driving circuit includes a driving transistor connected in series with a light-emitting element between a first power supply line and a second power supply line, a data transistor electrically connected to a gate electrode of the driving transistor, a boost module configured to load a boost input signal. An output terminal of the boost module is electrically connected to the gate electrode of the driving transistor to increase a voltage of the gate electrode of the driving transistor from a first voltage to the second voltage. A connection point between a first capacitor and a second capacitor is connected to the gate electrode of the driving transistor.

20 Claims, 6 Drawing Sheets

(56) References Cited

U.S. PATENT DOCUMENTS

| | | | | |
|---|---|---|---|---|
| 12,183,279 | B2 | 12/2024 | Hu | |
| 2014/0035799 | A1* | 2/2014 | Bae | G09G 3/3233 345/82 |
| 2015/0371606 | A1* | 12/2015 | Lee | G09G 3/3233 345/82 |
| 2018/0190196 | A1* | 7/2018 | Kwon | H10K 59/35 |
| 2021/0005138 | A1 | 1/2021 | Umezawa | |
| 2021/0134227 | A1* | 5/2021 | Im | G09G 3/3233 |
| 2022/0366835 | A1* | 11/2022 | Park | G09G 3/3233 |
| 2025/0140181 | A1 | 5/2025 | Hu | |
| 2025/0201169 | A1 | 6/2025 | Hu | |

FOREIGN PATENT DOCUMENTS

| | | |
|---|---|---|
| CN | 108269527 | 7/2018 |
| CN | 108847183 | 11/2018 |
| CN | 110010064 | 7/2019 |
| CN | 111754920 | 10/2020 |
| CN | 112331134 | 2/2021 |
| CN | 112750398 | 5/2021 |
| CN | 112885304 | 6/2021 |
| CN | 114023261 | 2/2022 |
| CN | 114464138 | 5/2022 |
| CN | 114913802 | 8/2022 |
| CN | 114913803 | 8/2022 |
| CN | 114913804 | 8/2022 |

OTHER PUBLICATIONS

Notification of Office Action and Search Report Dated Apr. 19, 2025 From the State Intellectual Property Office of the People's Republic of China Re. Application No. 202210615801.3 and Its Translation Into English. (19 Pages).

* cited by examiner

PIXEL DRIVING CIRCUIT AND DISPLAY PANEL

RELATED APPLICATIONS

This application is a National Phase of PCT Patent Application No. PCT/CN2022/103210 having International filing date of Jul. 1, 2022, which claims the benefit of priority of China Patent Application No. 202210615801.3 filed on May 31, 2022. The contents of the above applications are all incorporated by reference as if fully set forth herein in their entirety.

FIELD AND BACKGROUND OF THE INVENTION

The present application relates to a field of display technology, and in particular, to a pixel driving circuit and a display panel.

Currently, for the current-driven light-emitting elements, a luminance of the current-driven light-emitting elements depends on a magnitude of a current flowing through the current-driven light-emitting elements. After the panel is produced, a light-emitting brightness of the current-driven light-emitting element is generally adjusted by adjusting a magnitude of the data voltage, and the gate-source voltage of the driving transistor does not change during the light-emitting stage. That is, a light-emitting brightness of the current-driven light-emitting element cannot be changed. However, limited by a hardware of the data driving chip, and due to an influence of the threshold voltage on a uniformity of the picture, the gate-source voltage of the driving transistor is low in a light-emitting stage, so that a current flowing through the current-driven light-emitting element is low, causing brightness of the current-driven light-emitting element and a display panel including the current-driven light-emitting element are low.

Therefore, the currently display panel is limited by the hardware influence of the data driving chip causes a low luminous brightness, which is in urgent need of improvement.

SUMMARY OF THE INVENTION

Embodiments of the present application provide a pixel driving circuit and a display panel, to solve a technical problem that the currently self-luminous display is limited by a hardware influence of a data driving chip and has low luminous brightness.

Embodiments of the present application provide a pixel driving circuit, including: a driving transistor connected in series with a light-emitting element between a first power supply line and a second power supply line, wherein a source electrode of the driving transistor is electrically connected to the light-emitting element;

a data transistor, wherein a source electrode of the data transistor is electrically connected to a data line, a drain electrode of the data transistor is electrically connected to a gate electrode of the driving transistor, and wherein a gate electrode of the data transistor is loaded with a data control signal; and a boost module, wherein an input terminal of the boost module is configured to load a boost input signal, and wherein an output terminal of the boost module is electrically connected to the gate electrode of the driving transistor;

wherein the boost module controls a voltage of the gate electrode of the driving transistor to be increased from a first voltage in a first stage to a second voltage in a second stage, wherein the second stage is after the first stage, and wherein the driving transistor is configured to generate a driving current at least according to the second voltage to drive the light-emitting element to emit light;

wherein the boost module includes:

a first capacitor, wherein a first plate of the first capacitor is electrically connected to the input terminal of the boost module to load the boost input signal, and wherein a second plate of the first capacitor is electrically connected to the gate electrode of the driving transistor; and a second capacitor, wherein a first plate of the second capacitor is electrically connected to the gate electrode of the driving transistor to serve as the output terminal of the boost module, and wherein a second plate of the second capacitor is loaded the first signal.

The present application provides a pixel driving circuit and a display panel. The pixel driving circuit includes: a driving transistor connected in series with a light-emitting element between a first power supply line and a second power supply line, wherein a source electrode of the driving transistor is electrically connected to the light-emitting element; a data transistor, wherein a source electrode of the data transistor is electrically connected to a data line, a drain electrode of the data transistor is electrically connected to a gate electrode of the driving transistor, and wherein a gate electrode of the data transistor is loaded with a data control signal; a boost module, wherein an input terminal of the boost module is configured to load a boost input signal, and wherein an output terminal of the boost module is electrically connected to the gate electrode of the driving transistor; wherein the boost module controls a voltage of the gate electrode of the driving transistor to be increased from a first voltage in a first stage to a second voltage in a second stage, wherein the second stage is after the first stage, and wherein the driving transistor is configured to generate a driving current at least according to the second voltage to drive the light-emitting element to emit light; wherein the boost module includes: a first capacitor, wherein a first plate of the first capacitor is electrically connected to an input terminal of the boost module to load the boost input signal, and wherein a second plate of the first capacitor is electrically connected to the gate electrode of the driving transistor; and a second capacitor, wherein a first plate of the second capacitor is electrically connected to the gate electrode of the driving transistor to serve as the output terminal of the boost module. In the present application, by setting the boost module whose input terminal is loaded with the boost input signal, and the output terminal of the boost module is electrically connected to the gate electrode of the driving transistor, combined with a voltage dividing effect of the first capacitor and the second capacitor, to modulate the gate voltage of the driving transistor to increase from the first voltage to the second voltage, thereby increasing a driving current flowing through the light-emitting element to improve a light-emitting brightness of the light-emitting element, thereby improving a brightness of the display panel.

BRIEF DESCRIPTION OF THE SEVERAL VIEWS OF THE DRAWINGS

The present application will be further described below with reference to the accompanying figures. It should be noted that the accompanying figures in the following description are only used to explain some embodiments of the present application. For those skilled in the art, other figures can also be obtained from these figures without any inventive step.

DESCRIPTION OF SPECIFIC EMBODIMENTS OF THE INVENTION

Figure 1:
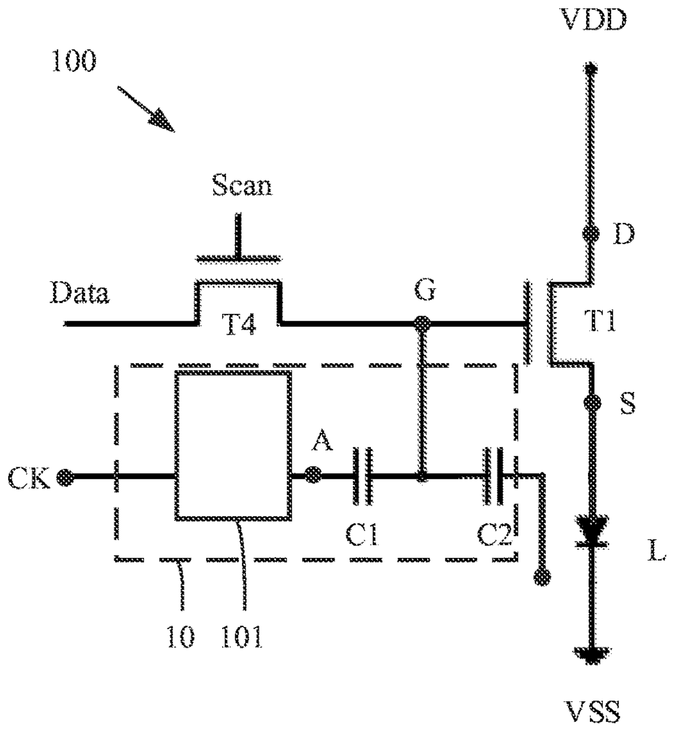
FIG. 1 is a circuit diagram of a first pixel driving circuit provided by one embodiment of the present application.

The technical solutions in the embodiments of the present application will be clearly and completely described below with reference to the accompanying figures in the embodiments of the present application. Obviously, the described embodiments are only a part of the embodiments of the present application, but not all of the embodiments. Based on the embodiments in the present application, all other embodiments obtained by those skilled in the art without inventive step fall within a protection scope of the present application.

The terms “first”, “second”, “third”, etc. in the present application are used to distinguish different objects, rather than to describe a specific order. Furthermore, the terms “including” and “having” and any variations thereof are intended to cover non-exclusive inclusion. For example, a process, a method, a system, a product or a device including a series of steps or modules is not limited to the listed steps or modules, but optionally also includes unlisted steps or modules, or optionally also includes other steps or modules inherent to these processes, methods, products or devices. In addition, the terms “source electrode” and “drain electrode” can be referred to interchangeably, as long as a corresponding transistor has at least one source electrode and at least one drain electrode.

Reference herein to an “embodiment” means that a particular feature, structure, or characteristic described in connection with the embodiment can be included in at least one embodiment of the present application. The appearances of the phrase in various places in the specification are not necessarily all referring to the same embodiment, nor a separate or alternative embodiment that is mutually exclusive of other embodiments. It is explicitly and implicitly understood by those skilled in the art that the embodiments described herein may be combined with other embodiments.

Embodiments of the present application provide a pixel driving circuit, and the pixel driving circuit includes but is not limited to the following embodiments and combinations of the following embodiments.

In one embodiment, as shown in FIG. 1 to FIG. 9, the pixel driving circuit 100 includes: a driving transistor T1 connected in series with a light-emitting element L between a first power supply line and a second power supply line, wherein a source electrode S of the driving transistor T1 is electrically connected to the light-emitting element L; a data transistor T4, wherein a source electrode of the data transistor T4 is electrically connected to a data line, wherein a drain electrode of the data transistor T4 is electrically connected to a gate electrode G of the driving transistor T1, and wherein a gate electrode of the data transistor T4 is loaded with a data control signal Scan; and a boost module 10, wherein an input terminal of the boost module 10 is configured to load a boost input signal CK, and wherein an output terminal of the boost module 10 is electrically connected to the gate electrode G of the driving transistor T1. The boost module 10 controls a voltage of the gate electrode G of the driving transistor T1 to be increased from a first voltage Vg1 in a first stage to a second voltage Vg2 in a second stage, wherein the second stage is after the first stage, and wherein the driving transistor T1 is configured to generate a driving current at least according to the second voltage Vg2 to drive the light-emitting element L to emit light. The boost module 10 includes: a first capacitor C1, wherein a first plate of the first capacitor C1 is electrically connected to an input terminal of the boost module 10 to load the boost input signal CK; and a second capacitor C2, wherein a second plate of the first capacitor C1 and a first plate of the second capacitor C2 are electrically connected to the gate electrode G of the driving transistor T1 to serve as the output terminal of the boost module 10, and wherein a second plate of the second capacitor C2 is loaded the first signal.

As shown in FIG. 1 to FIG. 9, the first power supply line can be loaded with a first power supply signal VSS, the second power supply line can be loaded with a second power supply signal VDD. A magnitude of the voltage of the first power supply signal VSS and a magnitude of the second power supply signal VDD can be two constant voltage values. A voltage value corresponding to the first power supply signal VSS is less than a voltage value corresponding to the second power supply signal VDD. The driving transistor T1 is an N-type transistor or a P-type transistor. The light-emitting element L may be, but not limited to, an organic light-emitting semiconductor, a light-emitting diode, a micro light-emitting diode, or a sub-millimeter light-emitting diode.

Specifically, as shown in FIGS. 1 to 6, the driving transistor T1 is an N-type transistor as an example for illustration. In combination with the above discussion, a drain electrode D of the driving transistor T1 can be electrically connected to a second power supply line to be loaded for the second power supply signal VDD, a source electrode S of the driving transistor T1 can be electrically connected to an anode of the light-emitting element L, a cathode of the light-emitting element L can be electrically connected to the first power supply line to be loaded with the first power supply signal VSS. For example, a value of the first power supply signal VSS corresponding to the power signal VSS is 0 volt, that is, the cathode of the light-emitting element L is grounded. Specifically, the gate-source voltage Vgs between the gate electrode G of the driving transistor T1 and the source electrode S of the driving transistor T1 drives the light-emitting element L to emit light. The driving current flowing to the light-emitting element L can be generated under an action of the first power signal VSS and the second power supply signal VDD when the driving transistor T1 is turned on. A magnitude of the driving current is positively related to the gate-source voltage Vgs between the gate electrode G of the driving transistor T1 and the source electrode S of the driving transistor T1. The voltage loaded to the gate electrode G of the driving transistor T1 can generally be determined according to a voltage value corresponding to an expected grayscale of the light-emitting element L. That is, it can be considered that a voltage value corresponding to the expected gray scale of the light-emitting element L determines a magnitude of the driving current flowing to the light-emitting element L, thereby determining a light-emitting brightness of the light-emitting element L.

It should be noted that since the light-emitting element L has a relatively stable voltage drop when the pixel driving circuit 100 is in the light-emitting stage, the source voltage Vs of the source electrode S of the driving transistor T1 can be a relatively stable value. That is, it can be considered that a light-emitting brightness of the light-emitting element L can be determined by a gate voltage Vg of the gate electrode G of the driving transistor T1. In combination with the above discussion, it can be known that the gate voltage Vg applied to the gate G of the driving transistor T1 can generally be determined according to the voltage value corresponding to the expected gray scale of the light-emitting element L. However, limited by the hardware influence of the data driving chip, and due to the influence of compensation in terms of threshold voltage and picture uniformity, the voltage applied to the gate electrode G of the driving transistor T1 "determined according to the voltage value corresponding to the expected gray scale of the light-emitting element L" is actually relatively low, so that the driving current flowing through the light-emitting element L is low, causing a luminous brightness of the light-emitting element L is low.

It can be understood that in this embodiment, the boost module 10 is provided, and the input terminal of the boost module 10 is loaded with the boost input signal CK, and the output terminal of the boost module 10 is electrically connected to the gate electrode G of the driving transistor T1. Compared with the above discussion, that is, the gate voltage Vg of the gate electrode G of the driving transistor T1 can also be determined by the boost input signal CK. In a first stage, the gate electrode G of the driving transistor T1 has the first voltage Vg1, the first stage here can be regarded as the "light-emitting stage" mentioned above. The first voltage Vg1 can be at least determined by a voltage applied to the gate electrode G of the driving transistor T1 which is "determined according to the voltage value corresponding to the expected gray scale of the light-emitting element L". The first voltage Vg1 enables the gate-source voltage Vgs of the driving transistor T1 to drive the light-emitting element L to emit light at a first brightness, wherein "the voltage value corresponding to the expected gray scale of the light-emitting element L" can be understood as the above-mentioned content and a data signal transmitted by a corresponding data line. Further, the boost module 10 is set that in a second stage, the gate electrode G of the driving transistor T1 has a second voltage related to the boost input signal CK Vg2. The second voltage Vg2 is greater than the first voltage Vg1. The second stage here can be understood as the "brightening stage" after the first stage (light-emitting stage). That is, the gate voltage Vg of the driving transistor T1 can be raised from the first voltage Vg1 to the second voltage Vg2 under an action of the boost module 10 and the boost input signal CK, thereby increasing the driving current flowing through the light-emitting element L. The second voltage Vg2 enables the gate-source voltage Vgs of the driving transistor T1 driving the light-emitting element L to emit light at a second luminance which is greater than the first luminance, to improve the light-emitting luminance of the light-emitting element L. A specific structure of the boost module 10 and a waveform of the boost input signal CK can be reasonably set according to the actual situation, so as to better improve the light-emitting brightness of the light-emitting element L.

Specifically, the second plate of the second capacitor C2 can be electrically connected to the first line to load the first signal. For example, in combination with the first capacitor C1 and the second capacitor C2, the voltage input signal CK can be reasonably set so that the gate electrode of the driving transistor can be increased from the first voltage in the first stage to the second voltage in the second stage. For example, as shown in FIGS. 1 to 9, the boost module 10 further includes a boost sub-module 101. An input terminal of the boost sub-module 101 is configured as the input terminal of the boost module 10. The input terminal of the boost sub-module 101 can be loaded with the boost input signal CK, so that the node A (ie, the output terminal of the boost sub-module 101) has a signal related to the boost input signal CK. Further, due to the first capacitor C1 and the second capacitor C2 is arranged in series, and the second plate of the first capacitor C1 and the first plate of the second capacitor C2 are both electrically connected to the gate electrode G of the driving transistor T1, and the second plate of the second capacitor C2 is electrically connected to the first line to load the first signal. That is, the first capacitor C1 and the second capacitor C2 can share a voltage difference between the first line and the node A, so that the gate electrode G of the driving transistor T1 has a voltage value related to a voltage difference between the first line and the node A. That is, the gate voltage Vg of the driving transistor T1 is raised from the first voltage Vg1 to the second voltage Vg2 through the boost module 10 and the boost input signal CK.

In one embodiment, as shown in FIG. 2 to FIG. 9, the boost sub-module 101 includes a first boost transistor T2. A drain electrode of the first boost transistor T2 is electrically connected to the first plate of the first capacitor C1 to be used as the output terminal of the boost sub-module 101. A source electrode of the first boost transistor T2 is electrically connected to the input terminal of the boost module 10. A gate electrode of the first boost transistor T2 is loaded with a first boost control signal. The first boost transistor T2 is turned on in both the first stage and the second stage. The boost input signal CK has a first boost input voltage Vcl in the first stage, the boost input signal CK has a second boost input voltage Vch in the second stage, wherein the second boost input voltage is greater than the first boost input voltage.

Figure 2:
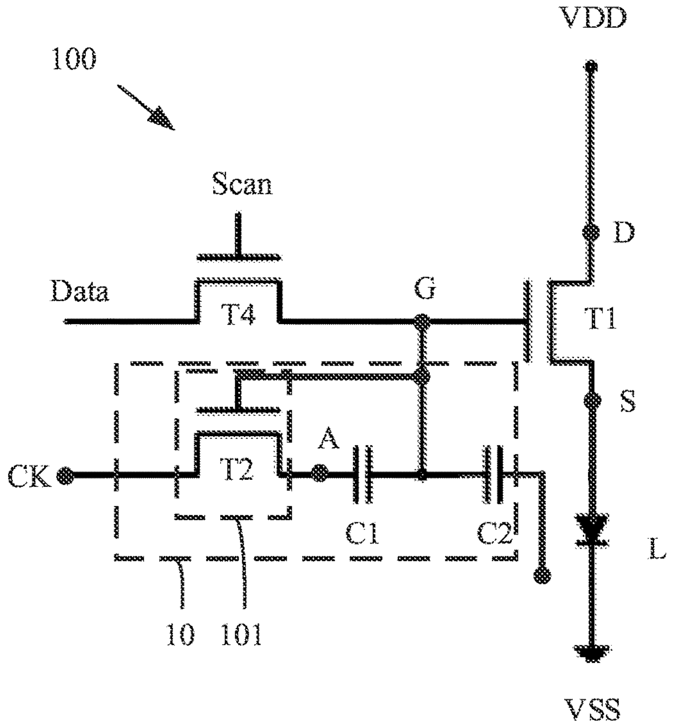
FIG. 2 is a circuit diagram of a second pixel driving circuit according to one embodiment of the present application.

The first boost transistor T2 is an N-type transistor or a P-type transistor. Herein, the first boost transistor T2 is an N-type transistor as an example for description. Specifically, as shown in FIG. 2, the gate electrode of the first boost transistor T2 can be electrically connected to the gate electrode G of the driving transistor T1 to obtain the gate voltage Vg of the gate electrode G of the driving transistor T1 as a first boost control signal. Combined with the above discussion, in the first stage, that is, in the light-emitting stage, the gate voltage Vg of the gate electrode G of the driving transistor T1 has a higher first voltage Vg1 to turn on the driving transistor T1, which can also be considered to turn on the first boost transistor T2 at the same time, so that the boost input signal CK is loaded to the second plate of the first capacitor C1 through the first boost transistor T2 to make a voltage of an node A is equal to the first boost input voltage Vcl. In the second stage, at an initial moment, the first boost transistor T2 can still be driven by the gate voltage Vg of the gate electrode G of the driving transistor T1 to be turned on, so that the boost input signal CK is loaded to the second plate of the first capacitor C1 through the first boost transistor T2 to make the voltage of node A is equal to the second boost input voltage Vch. That is, a change value ΔVa of the voltage of node A can be positively correlated with (Vch-Vcl), even equal to (Vch−Vcl). A voltage difference between the first electrode of the first capacitor C1 and the second electrode of the second capacitor C2 cannot abruptly change, therefore a change value of the gate voltage Vg of the gate electrode G of the driving transistor T1 which is electrically connected to the second plate of first capacitor C1 is also at least positively correlated with (Vch−Vcl), even equal to (Vch−Vcl), when the change of the first signal on the first line is not considered. Therefore, the gate voltage Vg of the gate electrode G of the driving transistor T1 is raised from the first voltage Vg1 to the second voltage Vg2, thereby increasing the driving current flowing through the light-emitting element L to improve the light-emitting brightness of the light-emitting element L.

Figure 3:
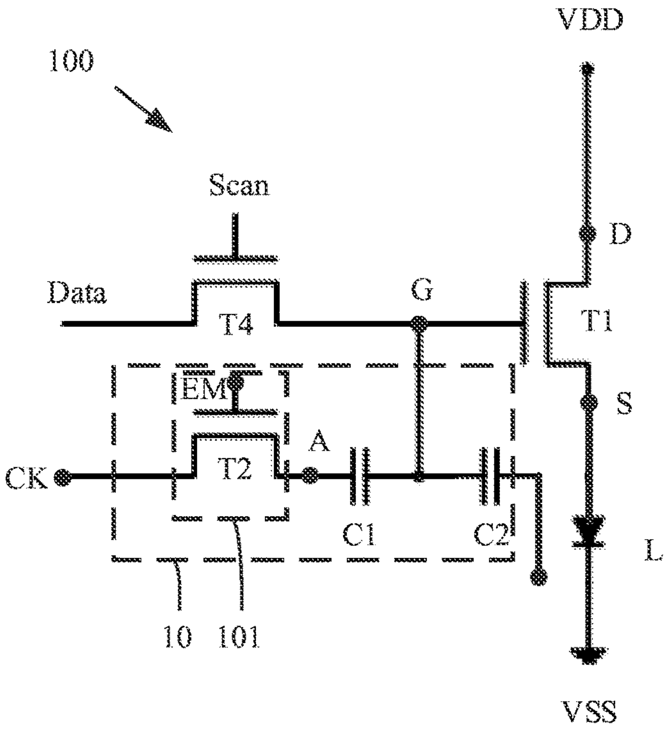
FIG. 3 is a circuit diagram of a third pixel driving circuit according to one embodiment of the present application.

Of course, as shown in FIG. 3, the gate electrode of the first boost transistor T2 can also electrically connected to a boost control line to be loaded with the first boost control signal. The first boost control signal can be but not limited to light-emitting control signal EM. A waveform of the signal transmitted on the boost control line is the same or different from a waveform of the gate voltage Vg of the gate electrode G of the driving transistor T1, as long as it is satisfied that the first boost transistor T2 can be turned on in the first stage and the second stage. Specifically, the operating principle of the gate voltage Vg of the gate electrode G of the driving transistor T1 can be the same as the above "the gate electrode of the first boost transistor T2 can be electrically connected to the gate electrode G of the driving transistor T1" for the operating principle on the gate voltage Vg of the gate electrode G of the driving transistor T1.

In particular, for example, without considering the change of the first signal on the first line, if the voltage value of the boost input signal CK remains unchanged, that is, the voltage of the node A remains unchanged, when the gate electrode G of the driving transistor T1 is switched to a floating state by loading the first voltage Vg1, since a voltage difference across the first capacitor C1 cannot be abruptly changed, the gate voltage Vg of the gate electrode G of the driving transistor T1 also does not change.

Specifically, the voltage value of the first signal in the first time period is the same as the voltage value in the second time period as an example for description. In combination with the above discussion, that is, from the first time period to the second time period, the voltage value corresponding to the boost input signal CK is raised from the first boost input voltage Vcl to the second boost input voltage Vch. Since a voltage dividing action of the first capacitor C1 and the second capacitor C2, the gate voltage Vg of the gate electrode G of the driving transistor T1 can be increased by ΔVa*C1/(C1+C2). That is, the gate voltage Vg of the driving transistor T1 is raised from the first voltage Vg1 to the second voltage Vg2 by the boost module 10 and the boost input signal CK, thereby increasing the driving current flowing through the light-emitting element L, to improve the luminance of the light-emitting element L. A specific structure and parameters of the boost module 10 and the waveform of the boost input signal CK can be reasonably set according to an actual situation, so as to better improve the light-emitting brightness of the light-emitting element L.

Figure 4:
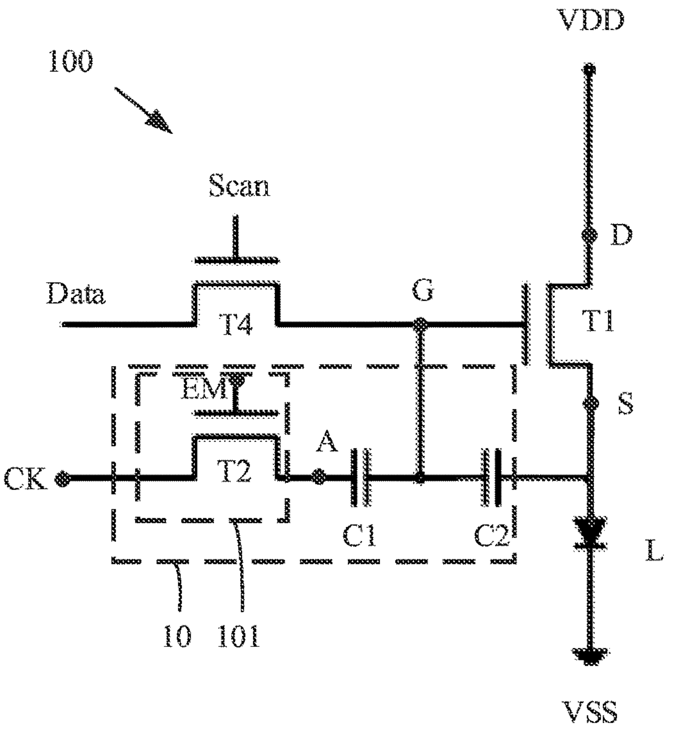
FIG. 4 is a circuit diagram of a fourth pixel driving circuit provided by one embodiment of the present application.
Figure 5:
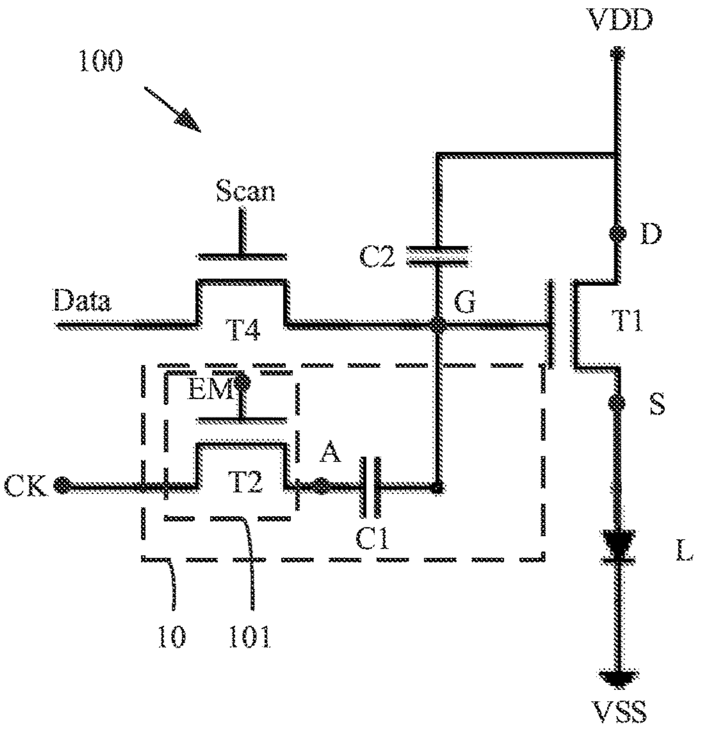
FIG. 5 is a circuit diagram of a fifth pixel driving circuit according to one embodiment of the present application.

Further, as shown in FIG. 4, it can be connected to the source electrode S of the driving transistor T1 through the first line (that is, the second plate of the first capacitor C1 is electrically connected to the source electrode S of the driving transistor T1), or as shown in FIG. 5, it can also be connected to the drain electrode D of the driving transistor T1 through the first line (that is, the second plate of the first capacitor C1 is electrically connected to the drain electrode D of the driving transistor T1), to achieve the first signal has a constant voltage during the first stage and the second stage. Specifically, as shown in FIG. 4, the light-emitting element L is in the light-emitting state in the first stage and the second stage, and based on a fact that the first power supply signal VSS is a constant voltage signal, it can be considered that the source electrode S of the driving transistor T1 has a relatively stable voltage (That is, a sum of the voltage value corresponding to the first power supply signal VSS and a voltage drop of the light-emitting element L). It can be approximately considered that the voltage on the first line remains unchanged. As shown in FIG. 5, based on the second power supply signal VDD is constant voltage signal, it can be considered that the drain electrode D of the driving transistor T1 has a relatively stable voltage, and it can be approximately considered that the voltage on the first line remains unchanged, which is similar to the voltage corresponding to the second power supply signal VDD. Of course, the first line can also be directly connected to other lines or signal sources to load a corresponding voltage signal or even a constant voltage signal.

In combination with the above analysis, the first signal can also have different voltages in the first stage and the second stage. For example, when the voltage value of the first signal in the second stage is greater than the voltage value of the first signal in the first stage, it is necessary to satisfy an absolute value of a change value of the voltage of the first signal acting on the gate electrode G of the driving transistor in the first stage and the second stage is less than an absolute value of a change of the voltage of the boost input signal CK acting on the gate electrode of the driving transistor T1 form the first stage to the second stage (That is, ΔVa*C1/(C1+C2)). For another example, when the voltage value of the first signal in the second stage is less than the voltage value in the first stage, ΔVa*C1/(C1+C2) is less than or even equal to 0.

Figure 6:
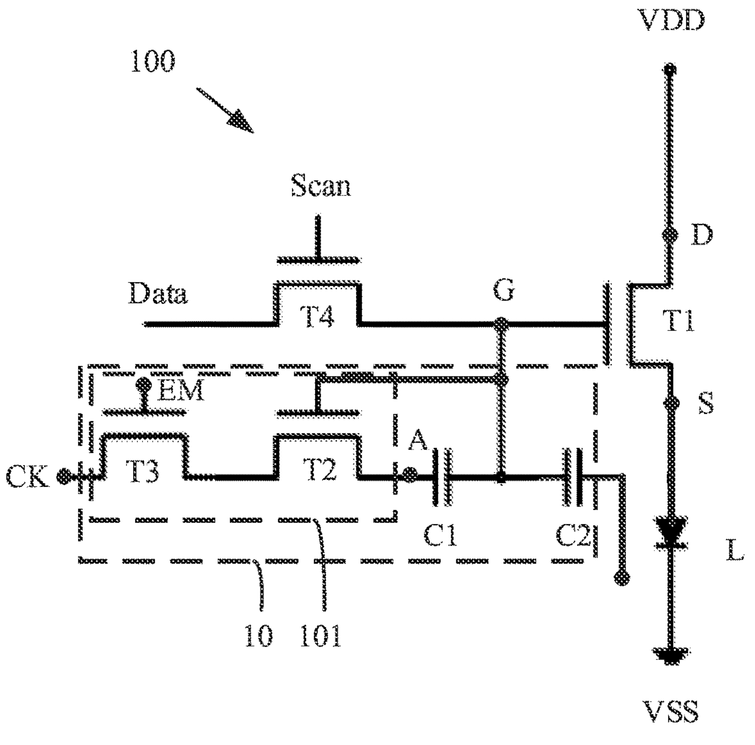
FIG. 6 is a circuit diagram of a sixth pixel driving circuit according to one embodiment of the present application.

In one embodiment, as shown in FIG. 6, the boost sub-module 101 further includes a second boost transistor T3. A drain electrode of the second boost transistor T3 is electrically connected to the source electrode of the first boost transistor T2, a source electrode of the second boost transistor T3 is electrically connected to the input terminal of the boost module 10, a gate electrode of the second boost transistor T3 is loaded with a second boost signal. The gate electrode of the first boost transistor T2 is electrically connected to the gate electrode of the driving transistor T1, and the second boost transistor T3 is turned on in the first stage and the second stage.

Specifically, in combination with the above discussion, based on the embodiment of "the gate electrode of the first boost transistor T2 can be electrically connected to the gate electrode G of the driving transistor T1 to obtain the gate voltage Vg of the gate electrode G of the driving transistor T1 as the first boost control signal", this embodiment is equivalent to adding a second boost transistor T3 whose turn-on condition is controlled by the second boost control signal, and the second boost transistor T3 is connected in series between the input terminal of the boost module 10 and the first boost transistor T2. That is, it can be considered that the first boost control signal and the second boost control signal jointly determine whether the boost input signal CK can be loaded to the node A, wherein the second boost control signal can be, but not limited to, light-emitting control signal EM. In combination with the above discussion, that is, on a basis that the first boost transistor T2 is controlled to be turned on in the first stage and the second stage by the first boost control signal. In this embodiment, the newly added second boost control signal, the two boost transistors T3 can further control whether the boost input signal CK can be loaded to the node A, thereby improving an operating accuracy of the boost module 10.

Figure 7:
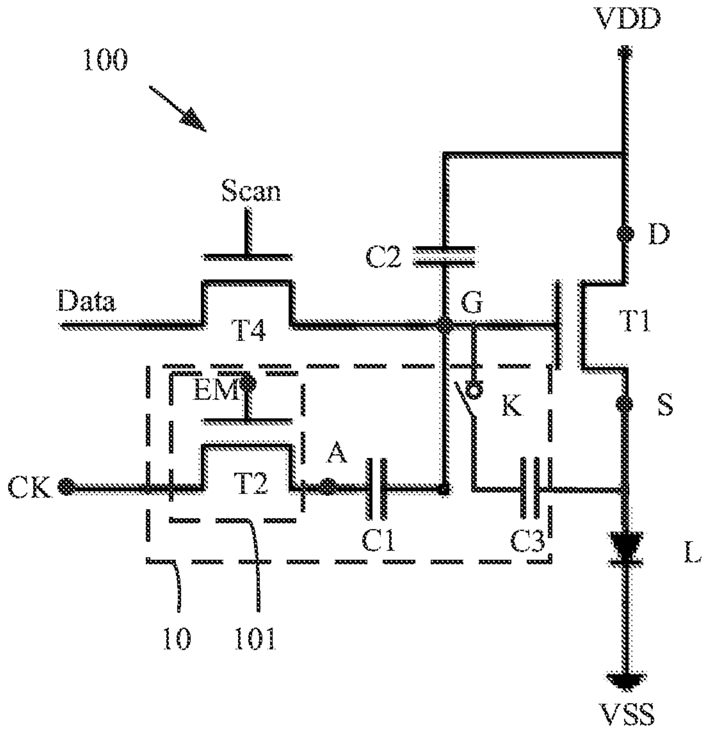
FIG. 7 is a circuit diagram of a seventh pixel driving circuit according to one embodiment of the present application.

In one embodiment, as shown in FIG. 7, the first line is different from the source electrode S of the driving transistor T1. For example, the second plate of the second capacitor C2 is electrically connected to the drain electrode D of the driving transistor T1. The boost module 10 further includes: a third capacitor C3 and a boost switch K. The boost switch K is connected in series with the third capacitor C3 between the gate electrode G of the driving transistor T1 and the source electrode S of the driving transistor T1. In the first stage and the third stage before the first stage, the boost switch K is turned on to control the gate electrode G of the driving transistor T1 is raised from the third voltage of the third stage to the first voltage of the first stage.

Similarly, in conjunction with the above discussion, in the first stage, the gate electrode G of the driving transistor T1 has a first voltage Vg1. The first stage can be regarded as the "light-emitting stage" mentioned above. The first voltage Vg1 can be at least determined by the voltage of "determined according to the voltage value corresponding to the expected gray scale of the light-emitting element L" applied to the gate electrode G of the driving transistor T1. Specifically, in this embodiment, the boost module 10 is also set so that in the third stage, the gate electrode G of the driving transistor T1 has a third voltage Vg3, and the third stage can be understood as the data writing stage before the light-emitting stage. That is, the third voltage Vg3 may be equal to the voltage of "determined according to the voltage value corresponding to the expected gray scale of the light-emitting element L" applied to the gate electrode G of the driving transistor T1, at this time, the source electrode S of the driving transistor T1 has a lower voltage. Further, in combination with the above discussion, in the light-emitting stage after the third stage, since the light-emitting element L is turned on, the voltage of the source electrode S of the driving transistor T1 is increased. Since the voltage difference across the third capacitor C3 cannot be abruptly changed, the gate voltage Vg of the gate electrode G of the driving transistor T1 can also be raised from the third voltage Vg3 to the first voltage Vg1 to increase the gate-source voltage Vgs of the driving transistor T1, thereby increasing the driving current flowing through the light-emitting element L to improve the light-emitting brightness of the light-emitting element L.

Therefore, a variation of the gate voltage Vg of the gate electrode G of the driving transistor T1 is related to the voltage of the source electrode S of the driving transistor T1 when the third voltage Vg3 is constant, specifically it is related to a difference between the voltages of the source electrode S of the driving transistor T1 in the third stage and in the first stage. It should be noted that, in combination with the above discussion, the boost switch K in this embodiment can be closed at least in the third stage and the first stage, so that the third capacitor C3 is electrically connected between the gate electrode G and the source electrode S of the driving transistor T1, so that a change of the gate voltage Vg of the gate electrode G of the driving transistor T1 follows a change of the source voltage Vs of the source electrode S of the driving transistor T1. The gate electrode G of the driving transistor T1 is turned off in the second stage to avoid the change of the gate voltage Vg of the gate electrode G of the driving transistor T1 causes the gate-source voltage Vgs cannot be raise due to the source voltage Vs of the source electrode S of the driving transistor T1 change synchronously, which causes the driving current flowing through the light emitting element L cannot be increased.

Figure 8:
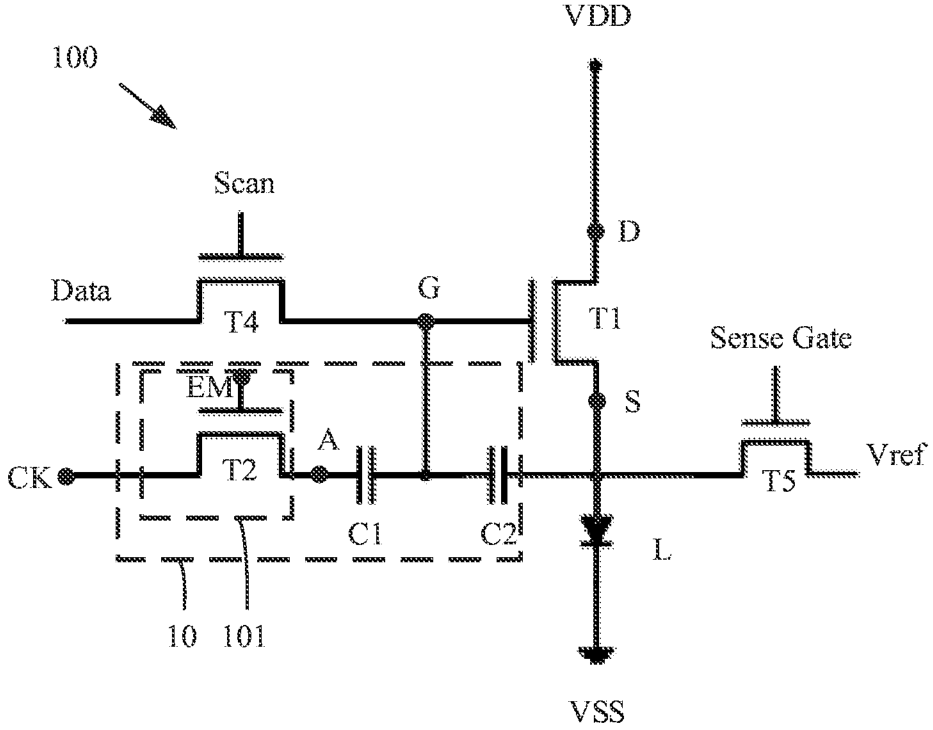
FIG. 8 is a circuit diagram of an eighth pixel driving circuit according to one embodiment of the present application.
Figure 9:
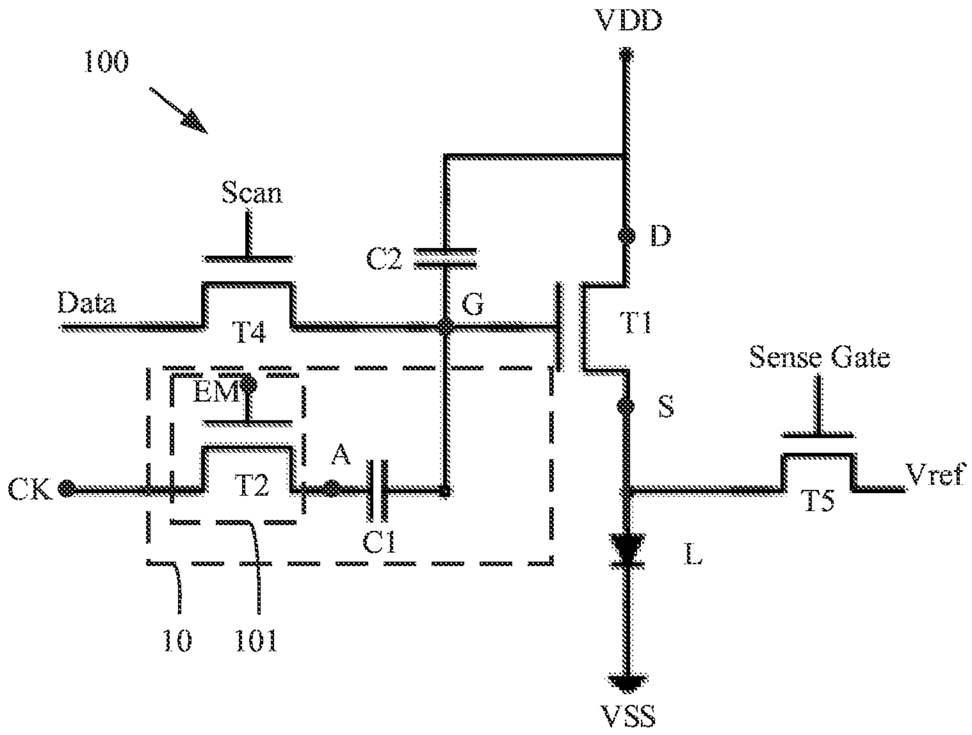
FIG. 9 is a circuit diagram of a ninth pixel driving circuit according to one embodiment of the present application.

In one embodiment, as shown in FIG. 8 and FIG. 9, the pixel driving circuit 100 further includes a reset transistor T5. A source electrode of the reset transistor T5 is electrically connected to a reset line, a drain electrode of the reset transistor T5 is electrically connected to the source electrode of the driving transistor T1, and a gate electrode of the reset transistor T5 is loaded with a reset control signal Sense Gate.

It should be noted that the pixel driving circuit 100 in the present application may include the boost module 10 and the driving transistor T1 as described above, and further include a data writing module and a reset module electrically connected to the driving transistor T1. The data writing module can be electrically connected to one of the gate electrode G and the source electrode S of the driving transistor T1. The reset module can be electrically connected to the other one of the gate electrode G and the source electrode S of the driving transistor T1. Specifically, in this embodiment, the data writing module is electrically connected to the gate electrode G of the driving transistor T1, the reset module is electrically connected to the source electrode S of the driving transistor T1, the data writing module includes the data transistor T4 mentioned above, the reset module includes the reset transistor T5 mentioned above as an example for illustration. That is, this embodiment is described based on an example in which the pixel driving circuit 100 includes a 3T1C circuit composed of a driving transistor T1, a data transistor T4, a reset transistor T5, and a second capacitor C2. Of course, the circuit included in the pixel driving circuit 100 is not limited to a 3T1C circuit, for example, a 6T1C circuit, a 7T1C circuit or other circuits may also be included.

It can be understood that, in combination with the above discussion, in this embodiment, the data control signal Scan can control the data transistor T4 to be turned on at least in the third stage, so that the data signal Data on the data line is loaded to the gate electrode G of the driving transistor T1 to turn on the driving transistor T1. The reset control signal Sense Gate can control the reset transistor T5 to turn on at least in the stage before the third stage. So that the reset signal Vref on the reset line is loaded to the source electrode S of the driving transistor T1 to reset the source electrode S of the driving transistor T1.

In one embodiment, a capacitance value of the first capacitor C1 is greater than a capacitance value of the second capacitor C2. Specifically, in combination with the above discussion, due to the series connection of the first capacitor C1 and the second capacitor C2, the second plate of the first capacitor C1 and the first plate of the second capacitor C2 are both electrically connected to the gate electrode G of the driving transistor T1, and the second plate of the second capacitor C2 is electrically connected to the first line to load the first signal. Further, based on that in the first stage to the second stage when a variation of a voltage corresponding to the first signal from the first stage is smaller than a variation of a voltage output by the output terminal of the boost sub-module 101 (greater than 0), a capacitance value of the first capacitor C1 can be set to be greater than a capacitance value of the second capacitor C2, to make a divided voltage on the first capacitor C1 is greater than a divided voltage on the second capacitor C2*a*, to further increase the driving current generated by the driving transistor T1.

One embodiment of the present application provides a display panel including a pixel driving circuit. The pixel driving circuit includes a first transistor connected in series with a light-emitting element between a first power supply line and a second power supply line, wherein a source electrode of the first transistor is electrically connected to the light-emitting element; a second transistor, wherein a source electrode of the second transistor is electrically connected to a first signal line, wherein a drain electrode of the second transistor is electrically connected to a gate electrode of the first transistor, and wherein a gate electrode of the second transistor is electrically connected to a second signal line; a first module, wherein an input terminal of the first module is electrically connected to a third signal line, wherein an output terminal of the first module is electrically connected to the gate electrode of the first transistor, and wherein a control terminal of the boost module is electrically connected to a fourth signal line. The first module includes: a first capacitor, wherein a first plate of the first capacitor is electrically connected to an input terminal of the first module, and wherein a second plate of the first capacitor is electrically connected to the gate electrode of the first transistor; and a second capacitor, wherein a first plate of the second capacitor is electrically connected to the gate electrode of the first transistor to serve as the output terminal of the first module, and wherein a second plate of the second capacitor is electrically connected to the source electrode or the drain electrode of the first transistor.

Specifically, the first module further includes a first sub-module. An input terminal of the first sub-module is configured as the input terminal of the first module, and wherein a first plate of the first capacitor is electrically connected to the output terminal of the first sub-module. Further, with reference to FIG. 1 to FIG. 9, the first transistor can refer to the above related description of the driving transistor T1, the second transistor can refer to the above related description of the data transistor T4, the first module can refer to the above related description of the boost module 10, the first sub-module can refer to the relevant description of the boost sub-module 101, the first capacitor can refer to the relevant description of the first capacitor C1, the second capacitor can refer to the relevant description of the second capacitor C2. Based on this, the first signal line may be the above-mentioned data line, the second signal line may be loaded with the above-mentioned data control signal, the third signal line may be loaded with the above-mentioned boost input signal, and the fourth signal line may be loaded with at least one of the first boost control signal, the second boost control signal mentioned above.

In one embodiment, the first sub-module includes a third transistor. A drain electrode of the third transistor is electrically connected to the first plate of the first capacitor to serve as the output terminal of the first sub-module, a source electrode of the third transistor is electrically connected to the input terminal of the first module, and the gate electrode of the third transistor is electrically connected to a fifth signal line.

Further, as shown in FIG. 1 to FIG. 9, regarding the third transistor, reference may be made to the above relevant description of the first boost transistor T2, and the fifth signal line loaded the first boost control signal mentioned above.

In one embodiment, the first sub-module further includes a fourth transistor. A drain electrode of the fourth transistor is electrically connected to the source electrode of the third transistor, a source electrode of the fourth transistor is electrically connected to the input terminal of the first module, and a gate electrode of the fourth transistor is electrically connected to a sixth signal line different from the gate electrode of the first transistor, wherein the gate electrode of the three transistor is electrically connected to the gate electrode of the driving transistor.

Further, as shown in FIG. 6, regarding the fourth transistor, reference may be made to the above relevant description of the second boost transistor T3, and the sixth signal line loaded the second boost control signal mentioned above.

In one embodiment, a second plate of the second capacitor is electrically connected to the drain electrode of the driving transistor, and the first module further includes a third capacitor and a first switch which are connected in series between the gate electrode of the first transistor and the source electrode of the first transistor. The first switch is configured to control the third capacitor to be electrically connected between the gate electrode of the first transistor and the source electrode of the first transistor.

Further, with reference to FIG. 7, regarding the third capacitor, reference may be made to the above relevant description of the third capacitor C3, and regarding the first switch, reference may be made to the above relevant description of the boost switch K.

In one embodiment, the pixel driving circuit further includes a fifth transistor. A source electrode of the fifth transistor is electrically connected to the seventh signal line, and the drain electrode of the fifth transistor is electrically connected to the source electrode of the first transistor, the gate electrode of the fifth transistor is electrically connected to the eighth signal line.

Further, as shown in FIG. 8 and FIG. 9, regarding the fifth transistor, reference may be made to the above relevant description of the reset transistor T5, and the eighth signal line loaded with the reset control signal mentioned above.

One embodiment of the present application provides a driving method, which is used for driving the pixel driving circuit 100 as described above with reference to FIG. 1 to FIG. 9, including: in the first stage, setting the boost input signal CK according to the source voltage Vs of the source electrode S of the driving transistor T; controlling gate electrode G of the driving transistor T1 to have a second voltage Vg2 related to the boost input signal CK by the boost input signal CK and the boost module 10, wherein the second voltage Vg2 is greater than the first voltage Vg1 that the gate electrode of the driving transistor T1 has in the first stage.

Specifically, based on the above analysis, a magnitude of the driving current flowing through the light-emitting element L is positively correlated with a gate-source voltage Vgs between the gate electrode G and the source electrode S of the driving transistor T1. The first stage is a light-emitting stage, in the subsequent process when light-emitting element L emitting light, it can be considered that the source voltage Vs of the source electrode S of the driving transistor T1 is approximately equal to the source voltage Vs of the source electrode S of the driving transistor T1 in the first stage. Therefore, in this embodiment, in the first stage, the boost input signal CK is set according to the source voltage Vs of the source electrode S of the driving transistor T1, so that the second voltage Vg2 can be set according to the source voltage Vs of the source electrode S of the driving transistor T1. For example, the higher the source voltage Vs of the source electrode S of the driving transistor T1, in a case where the first boost input voltage Vcl in the first stage is determined in a corresponding boost input signal CK (eg equal to 0), the second boost input voltage Vch of the boost input signal CK in the second stage can be set higher, so that the gate electrode G of the driving transistor T1 has a higher second voltage Vg2 in the second stage, so that the gate-source voltage Vgs between the gate electrode G and the source electrode S of the driving transistor T1 is appropriate in the second stage.

Figure 10:
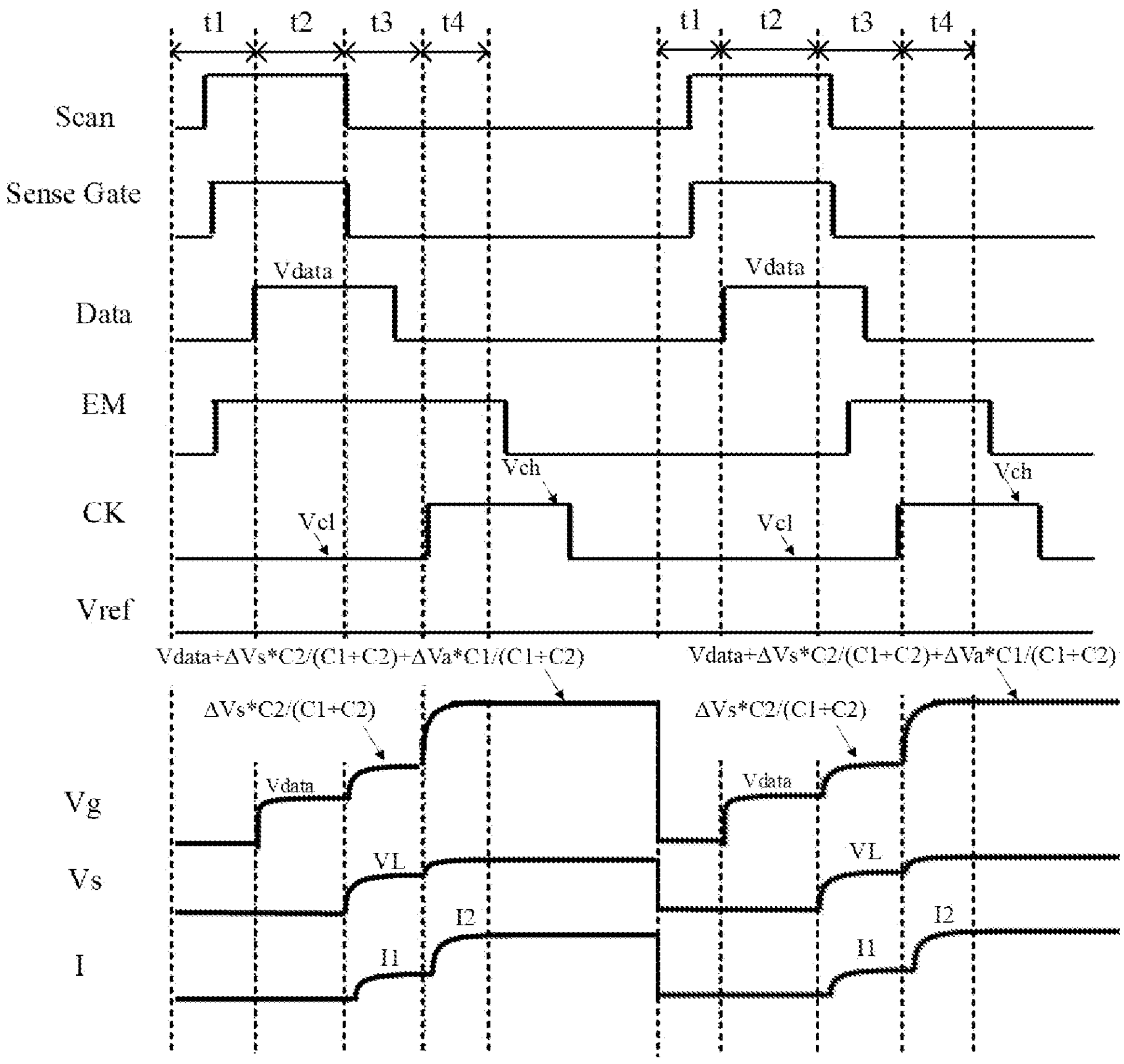
FIG. 10 is a waveform diagram of some signals provided by one embodiment of the present application.

Specifically, based on the circuit diagram shown in FIG. 8 and the time sequence diagram shown in FIG. 10, the operating process of the pixel driving circuit 100 may include but not be limited to the following stages:

In a reset stage t1, the data control signal Scan is equal to a corresponding high electrical potential to control the data transistor T4 turned on, the data signal Data on the data line is equal to a corresponding low electrical potential, and is transmitted to the gate electrode G of the driving transistor T1 through the data transistor T4 to reset the gate electrode G of the driving transistor T1. At the same time, the reset control signal Sense Gate is equal to a corresponding high electrical potential to control the reset transistor T5 turned on. The reset signal Vref on the reset line is always equal to a corresponding low electrical potential, and is transmitted to the source electrode S of the driving transistor T1 through the reset transistor T5 to reset the source electrode S of the driving transistor T1.

In a data writing stage t2, the data control signal Scan maintains a corresponding high electrical potential to keep the data transistor T4 turned on, and a data signal Data on the data line is equal to a corresponding high electrical potential Vdata and is transmitted to the gate electrode G of the driving transistor T1 through the data transistor T4, so that the gate voltage Vg of the gate electrode G of the driving transistor T1 is equal to Vdata, the second boost control signal (eg, the light-emitting control signal EM) is maintained at a corresponding high electrical potential, and the boost input signal CK on the input terminal of the boost module 10 is equal to a corresponding low electrical potential Vcl transmitted to the node A through the first boost transistor T2. At the same time, the reset control signal Sense Gate maintains a corresponding high electrical potential to keep the reset transistor T5 turned on, and the reset signal Vref on the reset line is always equal to a corresponding low electrical potential, and is transmitted to the source electrode S of the driving transistor T1 through the reset transistor T5, and keep the light-emitting element L is turned off.

In a light-emitting stage t3, the data control signal Scan is equal to a corresponding low electrical potential to control the data transistor T4 turned off, and the reset control signal Sense Gate is equal to a corresponding low electrical potential to control the reset transistor T5 turned off. First, at an initial moment, the gate voltage Vg of the gate G of the driving transistor T1 is still equal to Vdata, the reset transistor T5 is turned off, and at least a path formed by the first capacitor C1 maintains the gate voltage Vg of the driving transistor T1 is still equal to Vdata to keep the driving transistor T1 still turned on, the second power signal VDD on the second power supply line is always equal to a corresponding high electrical potential, the first power signal VSS on a first power supply line is always equal to a corresponding low electrical potential, the light-emitting element L is turned on, and the driving current I flows through the light-emitting element L at a first current value I1, the source voltage Vs of the source electrode S of the driving transistor T1 is equal to the turn-on voltage drop VL of the light-emitting element L, and the second boost control signal (eg, the light-emitting control signal EM) is still maintained at a corresponding high electrical potential, so that the first boost transistor T2 remains on, so that the boost input signal CK is equal to the corresponding low electrical potential Vcl to be transmitted to the node A. Further, since the voltage of the node A does not change, the source voltage Vs of the source electrode S of the driving transistor T1 increases by Δs. Combined with the voltage dividing effect of the first capacitor C1 and the second capacitor C2, the gate voltage Vg of the gate electrode G of the driving transistor T1 increases by ΔVs*C2/(C1+C2).

In a brightening stage t4, the gate voltage Vg of the gate electrode G of the driving transistor T1 is still equal to Vdata+ΔVs*C2/(C1+C2) at the initial moment, and the source voltage Vs of the source electrode S of the driving transistor T1 is still equal to the turn-on voltage drop VL of the light-emitting element L, to keep the first boost transistor T2 turned on by combining an action of the first capacitor C1, so that the boost input signal CK is equal to a corresponding high electrical potential Vch, and the boost input signal CK is transmitted to the node A. That is, the voltage of the node A is raised by ΔVa. Combined with the voltage division effect of the first capacitor C1 and the second capacitor C2, the gate voltage Vg of the gate electrode G of the driving transistor T1 also raises to Vdata+ΔVs*C2/(C1+C2)+ΔVa*C1/(C1+C2), at this time, the gate-source voltage Vgs between the gate electrode G and the source electrode S of the driving transistor T1 is increased, so that the driving current I flowing through the light-emitting element L is raised to the second current value I2. As a result, the source voltage Vs of the source electrode S of the driving transistor T1 is also slightly increased.

It can be understood that, in combination with the above discussion, in the present application, the pixel driving circuit 100 has the "brightening stage" mentioned above by setting the boost module 10 and the corresponding boost input signal CK. Further, the first capacitor C1 and the second capacitor C2 are set to divide the voltage, wherein the gate voltage Vg of the gate electrode G of the driving transistor T1 is increased in the "brightening stage", so that the gate voltage Vg of the gate electrode G is increased, and the source voltage Vgs between the gate electrode G and the source electrode S of the driving transistor T1 is increased. Therefore, the driving current I flowing through the light-emitting element L is also increased, thereby increasing a luminance of the light-emitting element L, thereby increasing a luminance of the display panel.

It should be noted that after the brightening stage t4 of this frame, even if the boost input signal CK is maintained at a corresponding high level for a period of time to achieve other functions for other devices loaded with the boost input signal CK, that is, to improve the multiplexing rate of the boost input signal CK, but the second boost control signal (eg, the light-emitting control signal EM) is equal to the corresponding low electrical potential, which can control the second boost transistor T3 to be turned off to make the node A float to end the modulation of the gate voltage Vg of the gate electrode G of the driving transistor T1. In addition, in conjunction with the above discussion, in the reset stage t1, the data writing stage t2, and the light-emitting stage t3 are in some frames, the change in the voltage of the node A is not required to modulate the gate voltage Vg of the gate electrode G of the driving transistor T1. Therefore, the second boost control signal (eg, the light-emitting control signal EM) can also be a corresponding low voltage in the reset stage t1 and the data writing stage t2 to control the second boost transistor T3 to be turned off to save energy.

One embodiment of the present application provides a display panel, which is shown in conjunction with FIG. 1 to FIG. 9 and includes a plurality of pixel driving circuits 100 as described above. Specifically, the display panel includes a display area and a non-display area surrounding the display area, a plurality of the pixel driving circuits 100 are provided in the display area, and further, at least some of the pixel driving circuits 100 are arranged in an array.

In one embodiment, as shown in FIG. 1 to FIG. 9, the display panel further includes a data generating chip positioned at least one side of the plurality of pixel driving circuits 100. A plurality of the data lines are electrically connected to the data generating chip obtains the data signal Data. Specifically, in combination with the above discussion, the data signal Data obtained by a corresponding data line can be loaded to the gate electrode G of the driving transistor T1 through the data transistor T4 to turn on the driving transistor T1 when the data transistor T4 is turned on, and then combined with a voltage-stabilizing effect of the second capacitor C2 and the source voltage Vs of the driving transistor T1 to control the light-emitting element L to emit light to the first brightness.

In one embodiment, an absolute value of a voltage value of a data signal of a pixel driving circuit 100 far from the data generating chip is greater than an absolute value of a voltage value of a data signal of a pixel driving circuit 100 close to the data generating chip. It should be noted that the data generating chip is disposed close to at least one side of the plurality of pixel driving circuits 100. That is, the distances between the plurality of pixel driving circuits 100 and the data generating chip are different, resulting in attenuations of the data signal Data received by the pixel driving circuits 100 at different positions are different. For example, the data signal Data loaded to each data line is the same, which will cause magnitudes of the voltage of the data signal Data finally be loaded on the pixel driving circuit 100 at different positions will be different, which affect a uniformity of the screen display.

It can be understood that, in this embodiment, the pixel driving circuit 100 far from the data generating chip has a greater degree of attenuation of the received data signal Data than the pixel driving circuit 100 close to the data generating chip. Based on this, this embodiment set the absolute value of the voltage value of the data signal Data loaded by the pixel driving circuit 100 far away from the data generating chip is higher to compensate for the excessively large data signal Data caused by the longer distance from the data generating chip. Therefore, the differences in attenuations of the data signal Data loaded by the pixel driving circuit 100 at different positions are reduced, and a uniformity of the display screen of the display panel is improved.

In one embodiment, as shown in FIG. 1 to FIG. 9, the display panel further includes a signal generating chip. The signal generating chip is positioned on at least one side of the plurality of pixel driving circuits 100, and the input terminals of the plurality of boost modules 10 are electrically connected to the signal generating chip to obtain the boost input signal CK. The boost input signal has a first boost input voltage in the first stage, and the boost input signal has a second boost input voltage in the second stage. The second boost input voltage is greater than the first boost input voltage. A difference between a corresponding second boost input voltage and a corresponding first boost input voltage of the pixel driving circuit away from the data generating chip is greater than a difference between a corresponding second boost input voltage and a corresponding first boost input voltage of the pixel driving circuit close to the data generating chip.

Specifically, both the signal generation chip and the data generating chip can pass through, but are not limited to, chip on film (COF), chip on glass (COG), chip on pi (COP) or other encapsulating techniques to be fixed to the non-display area on a front side or a back side of the display panel. Both the signal generating chip and the data generating chip may be disposed close to at least one side of the plurality of pixel driving circuits 100. That is, the distances between the pixel driving circuits 100 and the signal generating chips at different positions are different, and the distances between the pixel driving circuits 100 at different positions and the data generating chip are different. It should be noted that, in combination with the above discussion, distances between the pixel driving circuit 100 at different positions and the data generating chip are different, which will result in different degrees of attenuation of the data signal Data received by the pixel driving circuit 100 at different positions. For example, if the data signal Data loaded to each data line are the same, the voltage of the pixel driving circuit 100 finally loaded by the data signal Data at different positions will be different, which will affect a uniformity of the screen display. The attenuation degrees of the data signal Data different would also cause magnitude of the corresponding first voltages to be different.

It can be understood that, in this embodiment, the pixel driving circuit 100 far from the data generating chip has a greater degree of attenuation of the received data signal Data than the pixel driving circuit 100 close to the data generating chip. Based on this, in this embodiment, the boost input signal CK loaded by the pixel driving circuit 100 far from the data generating chip is set that a difference between the second boost input voltage Vch and a corresponding first boost input voltage Vcl is higher. That is, a change value of the voltage the node A ΔVa (which is positively correlated with (Vch−Vcl)) can also be larger to make up for the loss of the first brightness caused by the too small first voltage caused by a large distance from the data generating chip. By setting a higher ΔVa, a difference between the second voltage and the first voltage in the pixel driving circuit 100 at different positions can be reduced, so that the differences in the second brightness of the light-emitting element L at different positions can be smaller, and the uniformity of the display screen of the display panel can be improved.

The present application provides a pixel driving circuit and a display panel. The pixel driving circuit includes a driving transistor connected in series with a light-emitting element between a first power supply line and a second power supply line, wherein a source electrode of the driving transistor is electrically connected to the light-emitting element; a data transistor, wherein a source electrode of the data transistor is electrically connected to a data line, a drain electrode of the data transistor is electrically connected to a gate electrode of the driving transistor, and a gate electrode of the data transistor is loaded with a data control signal; a boost module, wherein an input terminal of the boost module is configured to load a boost input signal, and wherein an output terminal of the boost module is electrically connected to the gate electrode of the driving transistor. The boost module controls a voltage of the gate electrode of the driving transistor to be increased from a first voltage in a first stage to a second voltage in a second stage, wherein the second stage is after the first stage, and wherein the driving transistor is configured to generate a driving current at least according to the second voltage to drive the light-emitting element to emit light. The boost module includes: a first capacitor, wherein a first plate of the first capacitor is electrically connected to an input terminal of the boost module to load the boost input signal, and wherein a second plate of the first capacitor is electrically connected to the gate electrode of the driving transistor; and a second capacitor, wherein a first plate of the second capacitor is electrically connected to the gate electrode of the driving transistor to serve as the output terminal of the boost module. In the present application, by setting the boost module whose input terminal is loaded with the boost input signal, and the output terminal of the boost module is electrically connected to the gate electrode of the driving transistor, combined with a voltage dividing effect of the first capacitor and the second capacitor, to modulate the gate voltage of the driving transistor to increase from the first voltage to the second voltage, thereby increasing a driving current flowing through the light-emitting element to improve a light-emitting brightness of the light-emitting element, thereby improving a brightness of the display panel.

The pixel driving circuit and the display panel provided by the embodiments of the present application have been introduced in detail above. The principles and implementations of the present application are described with specific examples in this document. The descriptions of the above embodiments are only used to help understand the technical solutions and core ideas of the present application. Those of ordinary skill in the art should understand that they can still modify the technical solutions described in the foregoing embodiments, or perform equivalent replacements to some of the technical features. However, these modifications or replacements do not make an essence of the corresponding technical solutions deviate from a scope of the technical solutions of the embodiments of the present application.

What is claimed is:

1. A pixel driving circuit, comprising:

a driving transistor connected in series with a light-emitting element between a first power supply line and a second power supply line, wherein a source electrode of the driving transistor is electrically connected to the light-emitting element;

a data transistor, wherein a source electrode of the data transistor is electrically connected to a data line, a drain electrode of the data transistor is electrically connected to a gate electrode of the driving transistor, and a gate electrode of the data transistor is configured to receive a data control signal; and a boost module, wherein an input terminal of the boost module is configured to receive a boost input signal, and an output terminal of the boost module is electrically connected to the gate electrode of the driving transistor, wherein in a first stage, the gate electrode of the driving transistor has a first voltage and the driving transistor is turned on to drive the light-emitting element to emit light at a first luminance;

in a second stage after the first stage, the boost module is configured to control a voltage of the gate electrode of the driving transistor to increase from the first voltage to a second voltage greater than the first voltage and the driving transistor is turned on to drive the light-emitting element to emit light at a second luminance greater than the first luminance; and the boost module comprises:

a first capacitor, wherein a first plate of the first capacitor is electrically connected to the input terminal of the boost module to receive the boost input signal, and a second plate of the first capacitor is electrically connected to the gate electrode of the driving transistor; and a second capacitor, wherein a first plate of the second capacitor is electrically connected to the gate electrode of the driving transistor, and a second plate of the second capacitor is configured to receive a first signal.

2. The pixel driving circuit according to claim 1, wherein the boost module further comprises:

a boost sub-module, wherein an input terminal of the boost sub-module is configured as the input terminal of the boost module, and wherein the first plate of the first capacitor is electrically connected to an output terminal of the boost sub-module.

3. The pixel driving circuit according to claim 2, wherein the boost sub-module comprises:

a first boost transistor, wherein a drain electrode of the first boost transistor is electrically connected to the first plate of the first capacitor, a source electrode of the first boost transistor is electrically connected to the input terminal of the boost module, a gate electrode of the first boost transistor is configured to receive a first boost control signal, and the first boost transistor is turned on in the first stage and the second stage; and wherein the boost input signal has a first boost input voltage in the first stage, the boost input signal has a second boost input voltage in the second stage, and the second boost input voltage is greater than the first boost input voltage.

4. The pixel driving circuit according to claim 3, wherein the boost sub-module further comprises:

a second boost transistor, wherein a drain electrode of the second boost transistor is electrically connected to the source electrode of the first boost transistor, a source electrode of the second boost transistor is electrically connected to the input terminal of the boost module, a gate electrode of the second boost transistor is configured to receive a second boost control signal, and the second boost transistor is turned on in the first stage and the second stage; and wherein the gate electrode of the first boost transistor is electrically connected to the gate electrode of the driving transistor.

5. The pixel driving circuit of claim 1, wherein the first signal is at a constant voltage during the first stage and the second stage.

6. The pixel driving circuit of claim 1, wherein the second plate of the first capacitor is electrically connected to the source electrode of the driving transistor or a drain electrode of the driving transistor.

7. The pixel driving circuit according to claim 1, wherein the second plate of the second capacitor is electrically connected to a drain electrode of the driving transistor; and wherein the boost module further comprises:

a third capacitor; and a boost switch connected in series with the third capacitor between the gate electrode of the driving transistor and the source electrode of the driving transistor, wherein in the first stage and a third stage before the first stage, the boost switch is turned on to control the voltage of the gate electrode of the driving transistor to increase from a third voltage in the third stage to the first voltage.

8. The pixel driving circuit of claim 1, further comprising:

a reset transistor, wherein a source electrode of the reset transistor is electrically connected to a reset line, a drain electrode of the reset transistor is electrically connected to the source electrode of the driving transistor, and a gate electrode of the reset transistor is configured to receive a reset control signal.

9. The pixel driving circuit according to claim 1, wherein a capacitance value of the first capacitor is greater than a capacitance value of the second capacitor.

10. A display panel, comprising a plurality of pixel driving circuits each comprising:

a driving transistor connected in series with a light-emitting element between a first power supply line and a second power supply line, wherein a source electrode of the driving transistor is electrically connected to the light-emitting element;

a data transistor, wherein a source electrode of the data transistor is electrically connected to a data line, a drain electrode of the data transistor is electrically connected to a gate electrode of the driving transistor, and a gate electrode of the data transistor is configured to receive a data control signal; and a boost module, wherein an input terminal of the boost module is configured to receive a boost input signal, and an output terminal of the boost module is electrically connected to the gate electrode of the driving transistor, wherein in a first stage, the gate electrode of the driving transistor has a first voltage and the driving transistor is turned on to drive the light-emitting element to emit light at a first luminance;

in a second stage after the first stage, the boost module is configured to control a voltage of the gate electrode of the driving transistor to increase from the first voltage to a second voltage greater than the first voltage and the driving transistor is turned on to drive the light-emitting element to emit light at a second luminance greater than the first luminance; and the boost module comprises:

a first capacitor, wherein a first plate of the first capacitor is electrically connected to the input terminal of the boost module to receive the boost input signal, and a second plate of the first capacitor is electrically connected to the gate electrode of the driving transistor; and a second capacitor, wherein a first plate of the second capacitor is electrically connected to the gate electrode of the driving transistor, and a second plate of the second capacitor is configured to receive a first signal.

11. The display panel according to claim 10, further comprising:

a data generating chip positioned on at least one side of the plurality of pixel driving circuits, wherein a plurality of data lines are electrically connected to the data generating chip to obtain data signals.

12. The display panel according to claim 11, wherein an absolute value of a voltage value of one of the data signals corresponding to one of the pixel driving circuits far from the data generating chip is greater than an absolute value of a voltage value of one of the data signals corresponding to one of the pixel driving circuits close to the data generating chip.

13. The display panel of claim 11, further comprising:

a signal generating chip positioned at least one side of the plurality of pixel driving circuits, wherein the input terminal of the boost module of each of the pixel driving circuits is electrically connected to the signal generating chip to obtain the boost input signal, wherein the boost input signal has a first boost input voltage in the first stage, the boost input signal has a second boost input voltage in the second stage, and the second boost input voltage is greater than the first boost input voltage; and wherein a difference between the second boost input voltage and the first boost input voltage corresponding to one of the pixel driving circuits away from the data generating chip is greater than a difference between the second boost input voltage and the first boost input voltage corresponding to one of the pixel driving circuits close to the data generating chip.

14. A display panel, comprising at least one pixel driving circuit, wherein the pixel driving circuit comprises:

a first transistor connected in series with a light-emitting element between a first power supply line and a second power supply line, wherein a source electrode of the first transistor is electrically connected to the light-emitting element;

a second transistor, wherein a source electrode of the second transistor is electrically connected to a first signal line, a drain electrode of the second transistor is electrically connected to a gate electrode of the first transistor, and a gate electrode of the second transistor is electrically connected to a second signal line; and a first module, wherein an input terminal of the first module is electrically connected to a third signal line, an output terminal of the first module is electrically connected to the gate electrode of the first transistor, and a control terminal of the first module is electrically connected to a fourth signal line, wherein in a first stage, the gate electrode of the first transistor has a first voltage and the first transistor is turned on to drive the light-emitting element to emit light at a first luminance;

in a second stage after the first stage, the first module is configured to control a voltage of the gate electrode of the first transistor to increase from the first voltage to a second voltage greater than the first voltage and the first transistor is turned on to drive the light-emitting element to emit light at a second luminance greater than the first luminance; and wherein the first module comprises:

a first capacitor, wherein a first plate of the first capacitor is electrically connected to the input terminal of the first module, and a second plate of the first capacitor is electrically connected to the gate electrode of the first transistor; and a second capacitor, wherein a first plate of the second capacitor is electrically connected to the gate electrode of the first transistor, and a second plate of the second capacitor is electrically connected to the source electrode of the first transistor or a drain electrode of the first transistor.

15. The display panel of claim 14, wherein the first module further comprises:

a first sub-module, wherein an input terminal of the first sub-module is configured as the input terminal of the first module, and wherein the first plate of the first capacitor is electrically connected to an output terminal of the first sub-module.

16. The display panel according to claim 15, wherein the first sub-module comprises:

a third transistor, wherein a drain electrode of the third transistor is electrically connected to the first plate of the first capacitor, a source electrode of the third transistor is electrically connected to the input terminal of the first module, and a gate electrode of the third transistor is electrically connected to a fifth signal line.

17. The display panel according to claim 16, wherein the first sub-module further comprises:

a fourth transistor, wherein a drain electrode of the fourth transistor is electrically connected to the source electrode of the third transistor, a source electrode of the fourth transistor is electrically connected to the input terminal of the first module, and a gate electrode of the fourth transistor is electrically connected to a sixth signal line different from the gate electrode of the first transistor;

wherein the gate electrode of the third transistor is electrically connected to the gate electrode of the first transistor.

18. The display panel according to claim 14, wherein the second plate of the second capacitor is electrically connected to the drain electrode of the first transistor, and wherein the first module further comprises:

a third capacitor; and a first switch connected in series with the third capacitor between the gate electrode of the first transistor and the source electrode of the first transistor, wherein the first switch is configured to control the third capacitor to be electrically connected between the gate electrode of the first transistor and the source electrode of the first transistor.

19. The display panel according to claim 14, wherein the pixel driving circuit further comprises:

a fifth transistor, wherein a source electrode of the fifth transistor is electrically connected to a seventh signal line, a drain electrode of the fifth transistor is electrically connected to the source electrode of the first transistor, and a gate electrode of the fifth transistor is electrically connected to an eighth signal line.

20. The display panel according to claim 14, wherein the at least one pixel driving circuit comprises a plurality of pixel driving circuits, the display panel further comprising:

a data generating chip positioned on at least one side of the plurality of pixel driving circuits, wherein a plurality of data lines are electrically connected to the data generating chip to obtain data signals.

* * * * *